United States Patent
Pan et al.

(10) Patent No.: US 12,429,452 B2
(45) Date of Patent: Sep. 30, 2025

(54) REFERENCE ELECTRODE WITH SPEEK/IL SANDWICH STRUCTURE, AND PREPARATION METHOD AND USE THEREOF

(71) Applicant: ZHEJIANG UNIVERSITY, Zhoushan (CN)

(72) Inventors: Yiwen Pan, Zhoushan (CN); Yunwen Shen, Zhoushan (CN); Xiaoping Wang, Zhoushan (CN); Zhentao Sun, Zhoushan (CN)

(73) Assignee: ZHEJIANG UNIVERSITY, Zhoushan (CN)

( * ) Notice: Subject to any disclaimer, the term of this patent is extended or adjusted under 35 U.S.C. 154(b) by 266 days.

(21) Appl. No.: 18/211,304

(22) Filed: Jun. 19, 2023

(65) Prior Publication Data

US 2023/0333047 A1 Oct. 19, 2023

Related U.S. Application Data

(63) Continuation of application No. PCT/CN2021/130558, filed on Nov. 15, 2021.

(30) Foreign Application Priority Data

Dec. 28, 2020 (CN) .......................... 202011581890.1

(51) Int. Cl.
*G01N 27/333* (2006.01)
(52) U.S. Cl.
CPC ................................ *G01N 27/3335* (2013.01)

(58) Field of Classification Search
None
See application file for complete search history.

(56) References Cited

U.S. PATENT DOCUMENTS

2014/0158536 A1   6/2014   Thompson et al.

FOREIGN PATENT DOCUMENTS

| CN | 101523201 A | 9/2009 |
|---|---|---|
| CN | 102516531 A | 6/2012 |
| CN | 102971621 A | 3/2013 |
| CN | 104297313 A | 1/2015 |

(Continued)

OTHER PUBLICATIONS

H. Zhang, et al., "Enhanced anhydrous proton conductivity of polymer electrolyte membrane enabled by facile ionic liquid-based hoping pathways" Journal of Membrane Science, 476: p. 136-147, Nov. (Year: 2014).*

(Continued)

*Primary Examiner* — J. Christopher Ball
(74) *Attorney, Agent, or Firm* — Bayramoglu Law Offices LLC

(57) ABSTRACT

A reference electrode with a sulfonated polyether ether ketone/ionic liquid (SPEEK/IL) sandwich structure, and a preparation method and use thereof are provided. In the reference electrode, an end of a reference electrode main body is provided with the SPEEK/IL sandwich structure; the SPEEK/IL sandwich structure includes two layers of SPEEK/IL composite film and one layer of SPEEK film, and the SPEEK film is arranged at an outermost layer of the SPEEK/IL sandwich structure.

12 Claims, 3 Drawing Sheets

(56) References Cited

FOREIGN PATENT DOCUMENTS

CN 107596932 A 1/2018
CN 112782249 A 5/2021

OTHER PUBLICATIONS

Y. Shen, et al., "High anti-interference ability induced by the SP/SiOx/ImIL composite film on IrOx pH electrodes", Analytica Chimica Acta, 1197: p. 339489, Mar. 8, 2022.*

Zhun Li, et al., Addition of modified hollow mesoporous organosilica in anhydrous SPEEK/IL composite membrane enhances its proton conductivity, Journal of Membrane Science, 2021, pp. 1-10, vol. 620, 118897.

Leticia Guerreiro Da Trindade, et al., Modification of Sulfonated Poly(ether ether ketone) Membranes by Impregnation With the Ionic Liquid 1-Butyl-3-methylimidazolium tetrafluoroborate for Proton Exchange Membrane Fuel Cell Applications, Polymer Engineering and Science, 2016, pp. 1037-1044.

* cited by examiner

REFERENCE ELECTRODE WITH SPEEK/IL SANDWICH STRUCTURE, AND PREPARATION METHOD AND USE THEREOF

CROSS REFERENCE TO THE RELATED APPLICATIONS

This application is a continuation application of International Application No. PCT/CN2021/130558, filed on Nov. 15, 2021, which is based upon and claims priority to Chinese Patent Application No. 202011581890.1, filed on Dec. 28, 2020, the entire contents of which are incorporated herein by reference.

TECHNICAL FIELD

The present disclosure relates to the technical field of preparation of ion-selective film, in particular to a reference electrode with a sulfonated polyether ether ketone/ionic liquid (SPEEK/IL) sandwich structure, and a preparation method and use thereof.

BACKGROUND

Electrochemistry is an integral part of ocean chemistry research. Electrochemical in situ measurement is of great significance to the research in many fields of ocean chemistry. Most of the commercial Ag/AgCl reference electrodes have a glass shell outside and a saturated KCl solution with a constant concentration inside, and are easily damaged during in situ measurement in deep sea. An Ag/AgCl semi-reference electrode can work normally under high temperature and high pressure. However, in offshore seas with complex chemical environments, especially near the estuary of rivers where fresh water and sea water meet, potential drift of the semi-reference electrode generally occurs due to changes of a $Cl^-$ concentration in the water body. This may reduce the accuracy of detection. SPEEK films have desirable chemical stability, excellent high-temperature resistance, and high electrical conductivity. With the introduction of sulfonic acid groups, the sulfonation degree of the SPEEK is correspondingly increased, thus greatly improving the proton exchange capacity and ion conductivity of the film. However, in a polar environment, sulfonic acid groups of SPEEK's fluorocarbon backbone side chains tend to gather in clusters due to electromagnetic attraction. As a result, microscopic phase separation occurs between the sulfonic acid groups and the fluorocarbon backbone, allowing the passage of smaller-radius particles such as sulfide ions. Substances with redox properties can generate false signals on the surface of a working electrode, thereby affecting the accuracy of the detection.

SUMMARY

Aiming at the deficiencies of the prior art, an objective of the present disclosure is to provide a reference electrode with a SPEEK/IL sandwich structure, and a preparation method and use thereof.

The present disclosure provides a reference electrode with a SPEEK/IL sandwich structure, where an end of a reference electrode main body is provided with the SPEEK/IL sandwich structure: the SPEEK/IL sandwich structure includes two layers of SPEEK/IL composite film, namely an inner layer of SPEEK/IL composite film and an outer layer of SPEEK/IL composite film, and one layer of SPEEK film, and the SPEEK film serves as an outermost layer of the SPEEK/IL sandwich structure; an IL layer is filled between the reference electrode main body and the inner layer of SPEEK/IL composite film, between the two layers of SPEEK/IL composite film, and between the outer layer of SPEEK/IL composite film and the SPEEK film.

Preferably, the SPEEK/IL composite film is a SPEEK/$SiO_x$/IL composite film; the SPEEK/IL sandwich structure includes the two layers of SPEEK/$SiO_x$/IL composite film, namely an inner layer of SPEEK/$SiO_x$/IL composite film and an outer layer of SPEEK/$SiO_x$/IL composite film, and the one layer of SPEEK film, and the SPEEK film serves as the outermost layer of the SPEEK/IL sandwich structure; the IL layer is filled between the reference electrode main body and the inner layer of SPEEK/$SiO_x$/IL composite film, between the two layers of SPEEK/$SiO_x$/IL composite film, and between the outer layer of SPEEK/$SiO_x$/IL composite film and the SPEEK film.

Preferably, the reference electrode main body is an Ag/AgCl reference electrode; and the SPEEK/IL sandwich structure covers AgCl on a surface of the reference electrode.

The IL is [HOEtMIM][Cl] with a structural formula as follows:

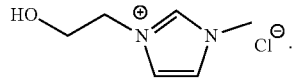

The IL refers to an organic salt that is liquid at or near a room temperature and completely composed of anions and cations. The IL has low volatility, strong conductivity, high viscosity, low vapor pressure, stable properties, excellent designability, desirable solubility for various substances, and no pollution. Therefore, the IL is called a "green solvent". In the present disclosure, the selected hydroxyl-functionalized IL ([HOEtMIM][Cl]) has extremely strong conductivity. The imidazole group in this IL is both acidic and basic, and can react with the sulfonic acid groups in SPEEK. In this way, the loss of IL during use is reduced, thereby increasing the conductivity of the composite film.

The SPEEK has a molecular structure as shown below:

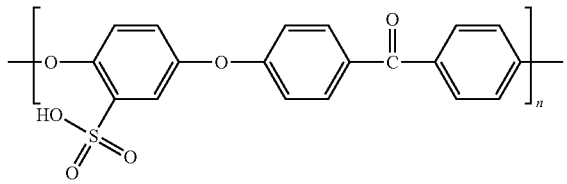

The SPEEK is a sulfonated product of polyether ether ketone (PEEK). The SPEEK has desirable proton conductivity and low cost. The SPEEK also includes narrow and tortuous ion permeation channels, which can isolate ions with a smaller particle size. Currently, the only problem to be solved is that the SPEEK has poor proton conductivity. In the present disclosure, a DMF solution of SPEEK is uniformly mixed with the IL, thereby avoiding the poor proton conductivity of the SPEEK and making up for the defect that the IL is easy to dissipate in polar solvents.

The present disclosure further provides a preparation method of the reference electrode with a SPEEK/IL sandwich structure, including the following steps:

1) pouring polyether ether ketone (PEEK) particles into concentrated sulfuric acid, and dissolving by stirring continuously; after the PEEK particles are completely dissolved, heating a resulting solution to 40° C. to 60° C., and conducting vulcanization for 2 h to 4 h in an inert gas atmosphere;
2) slowly pouring a polymer solution obtained in step 1) into an ice-water mixture to terminate the vulcanization, collecting obtained formed particles, washing the particles with water until a pH value of a washing solution reaches 6 to 7, and drying the particles in an oven at 50° C. to 70° C. for 12 h to 48 h to obtain SPEEK particles;
3) pouring the SPEEK particles into a solvent, and dissolving by stirring to obtain a 10 wt % SPEEK solution;
4) mixing an inorganic acid, a silicate, deionized water, and an alcohol as raw materials at a molar ratio of (0.01-0.1):1:(2-8):(2-8), and stirring to form a homogeneous solution; pouring the SPEEK solution obtained in step 3) into the homogeneous solution and stirring uniformly, and adding the IL dropwise and stirring to obtain a SPEEK/SiO$_x$/IL solution;
5) immersing the reference electrode main body into the IL, taking out and drying, such that a surface of the reference electrode is covered with an IL layer; immersing an obtained IL layer-covered reference electrode into the SPEEK/SiO$_x$/IL solution, taking out and air-drying upside down to form one layer of SPEEK/SiO$_x$/IL composite film on a surface of the IL layer-covered reference electrode;
6) repeating step 5) once on a final electrode product obtained in step 5) to obtain two layers of SPEEK/SiO$_x$/IL composite film; immersing an obtained bilayer SPEEK/SiO$_x$/IL composite film-covered reference electrode into the IL, taking out and drying, such that a surface of the outer SPEEK/SiO$_x$/IL composite film is covered with an IL layer; and
7) immersing a final reference electrode product obtained in step 6) into the SPEEK solution, taking out and air-drying upside down to obtain a reference electrode with the SPEEK/IL sandwich structure.

Compared with the prior art, in the present disclosure, the composite film with a SPEEK/IL sandwich structure is composed of two layers of evenly-mixed organic semipermeable SPEEK/SiO$_x$/IL film and free IL that are laminated in sequence. The IL mainly exists in ion clusters formed by the sulfonic acid groups of the SPEEK. The imidazole group in the IL is both basic and acidic, and can react with sulfonic acid groups. In this way, the microscopic phase separation between the sulfonic acid groups and the fluorocarbon skeleton is reduced while increasing the proton conductivity of the organic composite film. Multi-layer film coating is generally conducted on the reference electrode to reduce external interference. The traditional multi-layer SPEEK coating may reduce the proton conductivity due to a gap between two adjacent layers. In the present disclosure, the overall proton conductivity is increased by filling the two layers of SPEEK/IL film with free IL. Meanwhile, due to the high concentration of IL in the organic semipermeable film, the concentration of Cl$^-$ on the surface of the Ag/AgCl reference electrode remains unchanged, thus meeting the requirements of stability as a reference electrode. It is found form exploration of an internal shape of the SPEEK film that permeation channels inside the SPEEK film are narrower and more tortuous than those of the Nafion film. Accordingly, the reference electrode with a SPEEK/IL sandwich structure can exhibit desirable resistance to redox ion interference. Furthermore, the reference electrode has excellent mechanical strength and thermal stability, lower cost, and high environmental protection effect, and can be widely used in long-term electrochemical detection, deep sea exploration, chemical industry and other fields.

DETAILED DESCRIPTION OF THE EMBODIMENTS

The present disclosure is further described below with reference to the accompanying drawings and examples.

Figure 1:
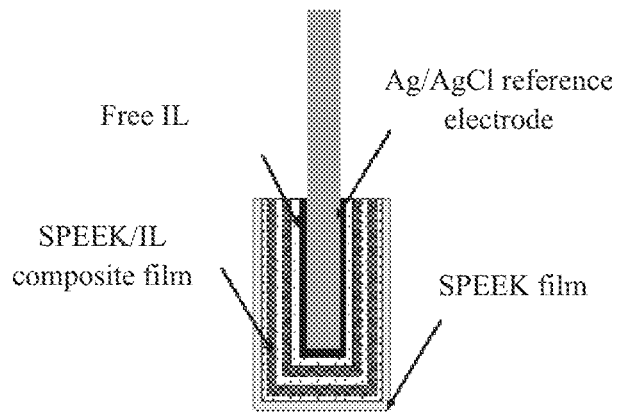
FIG. 1 shows a structural schematic diagram of the reference electrode with a SPEEK/IL sandwich structure of the present disclosure.

As shown in FIG. 1, in this embodiment, a reference electrode main body is an Ag/AgCl reference electrode; and the SPEEK/IL sandwich structure covers AgCl on a surface of the reference electrode. An IL is [HOEtMIM][Cl]; the composite film with a SPEEK/IL sandwich structure is composed of two layers of evenly-mixed organic semipermeable SPEEK/IL film and free IL that are laminated in sequence. The IL mainly exists in ion clusters formed by the sulfonic acid groups of the SPEEK. The imidazole group in the IL is both basic and acidic, and can react with sulfonic acid groups. In this way, the microscopic phase separation between the sulfonic acid groups and the fluorocarbon skeleton is reduced w % bile increasing the proton conductivity of the organic composite film. The overall proton conductivity is increased by filling the two layers of SPEEK/SiO$_x$/IL film with free IL. Meanwhile, due to the presence of high-concentration IL in the organic semipermeable film, a Cl$^-$ concentration on the surface of the Ag/AgCl reference electrode remains constant, thereby meeting the stability requirements as a reference electrode.

Example 1

1) A PEEK powder was poured into concentrated sulfuric acid, and dissolved by stirring continuously; after the PEEK powder was completely dissolved, a resulting solution was heated to 50° C., and vulcanization was conducted for 3 h in an inert gas atmosphere.
2) A polymer solution obtained in step 1) was slowly poured into an ice-water mixture to terminate the vulcanization, obtained formed particles were collected, the particles were washed with water until a pH value of a washing solution reached 6 to 7, and the particles were air-dried and then dried in an oven at 70° C. for 16 h to obtain SPEEK particles.
3) The SPEEK particles were poured into a solvent, and dissolved by stirring to obtain a 10 wt % SPEEK solution.

4) HCl, TEOS, deionized water, and ethanol as raw materials were mixed at a molar ratio of 0.01:1:4:4, and stirred to form a homogeneous solution as a precursor solution; the SPEEK solution obtained in step 3) was poured into the homogeneous solution and stirred uniformly, and the IL [HOEtMIM][Cl] was added dropwise and stirred to obtain a SPEEK/SiO$_x$/IL solution.

5) The Ag/AgCl reference electrode was immersed into the IL [HOEtMIM][Cl], taken out and dried, such that a surface of the reference electrode was covered with an IL layer; an obtained IL layer-covered reference electrode was immersed into the SPEEK/SiO$_x$/IL solution for 5 s, the electrode was turned such that the electrode was completely covered by the solution, taken out and air-dried upside down to form one layer of SPEEK/SiO$_x$/IL composite film on a surface of the IL layer-covered reference electrode.

6) Step 5) was repeated once on a final electrode product obtained in the step 5) to obtain two layers of SPEEK/SiO$_x$/IL composite film; an obtained bilayer SPEEK/SiO$_x$/IL composite film-covered reference electrode was immersed into the IL, taken out and dried, such that a surface of an outer layer of SPEEK/SiO$_x$/IL composite film was covered with an IL layer.

7) A final reference electrode product obtained in step 6) was immersed into the SPEEK solution, taken out and air-dried upside down to obtain a reference electrode with a SPEEK/IL sandwich structure.

Figure 2:
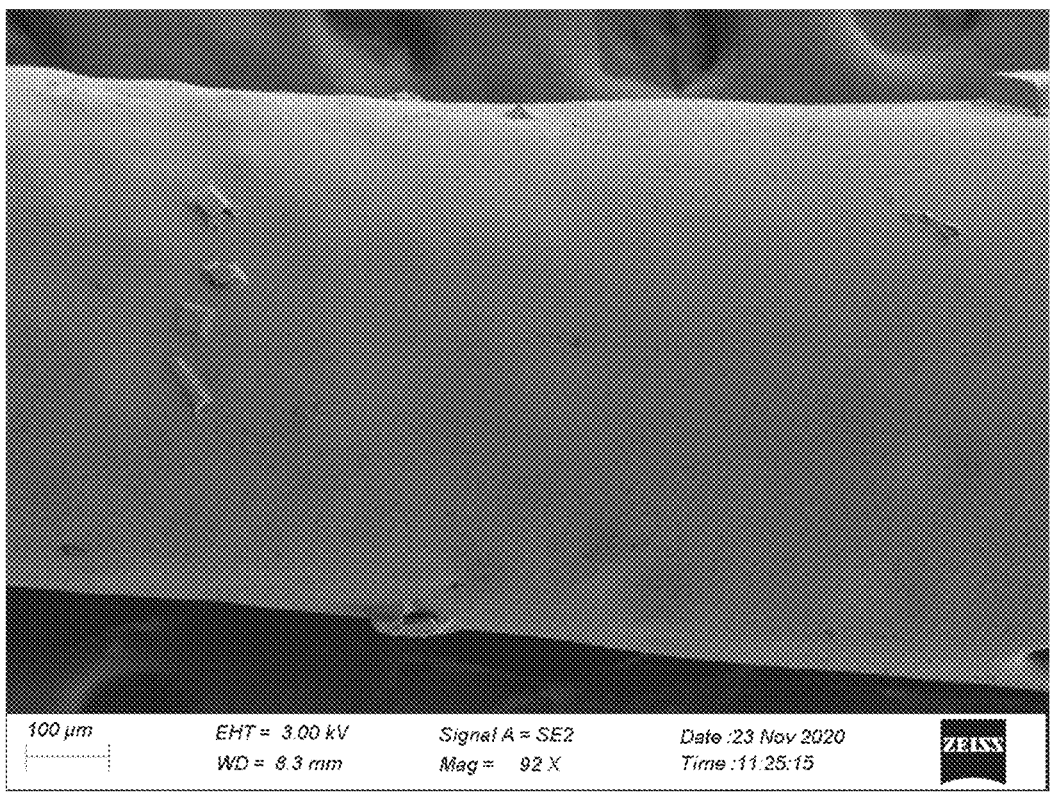
FIG. 2 shows a scanning electron microscopy (SEM) image (100 μm) of a surface of an electrode obtained in an example.
Figure 3:
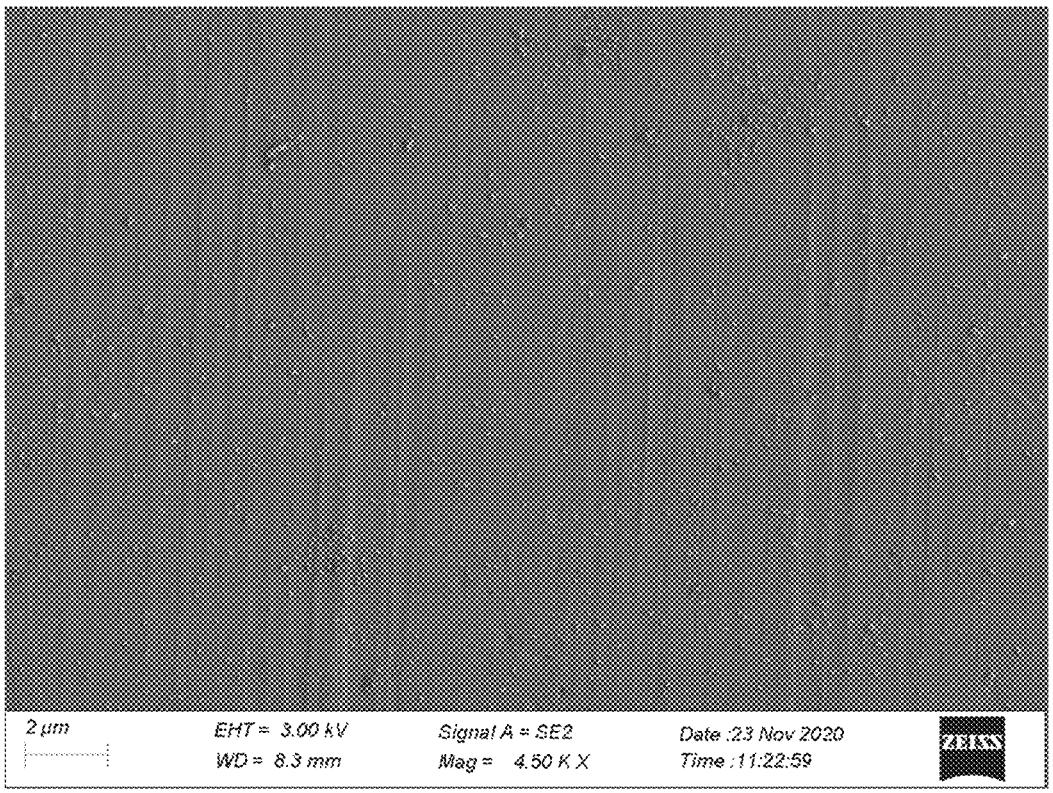
FIG. 3 shows a SEM image (2 μm) of the surface of the electrode obtained in the example.
Figure 4:
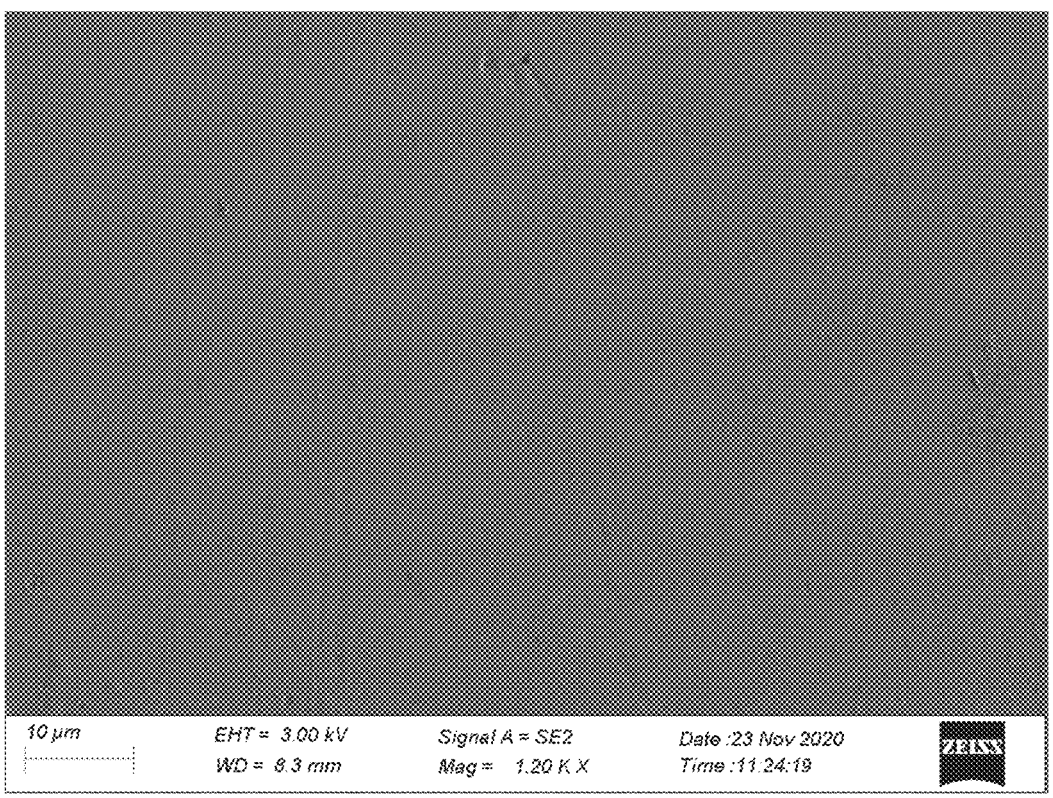
FIG. 4 shows a SEM image (10 μm) of the surface of the electrode obtained in the example.

FIG. 2 to FIG. 4 were SEM images. As shown in the figures, it was observed that a complete and uniform layer of SPEEK/SiO$_x$/IL composite film was formed on the electrode surface. This demonstrated that the material could be applied to cover the sensitive layer of the electrode by a drop coating method.

Figure 5:
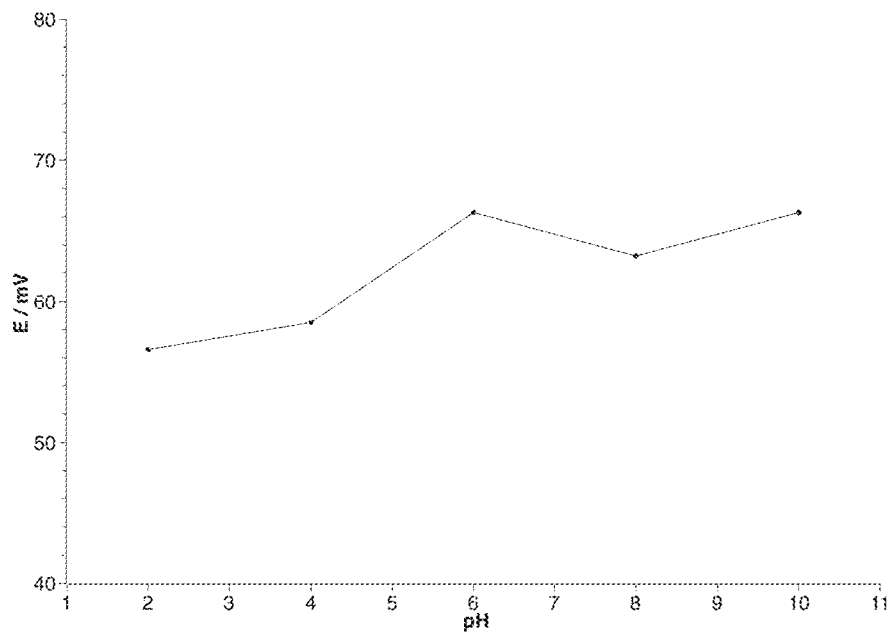
FIG. 5 shows an impact result of pH on a stability of the reference electrode with a SPEEK/IL sandwich structure investigated in a buffer with a pH value of 2 to 10.

FIG. 5 showed an impact result of pH on a stability of the reference electrode with a SPEEK/IL sandwich structure investigated in a buffer with a pH value of 2 to 10. It was seen from the figure that the electrode changed only 13 mV within a test pH range of the open circuit, indicating that the potential of the prepared film electrode was hardly affected by the pH value of the solution.

Figure 6:
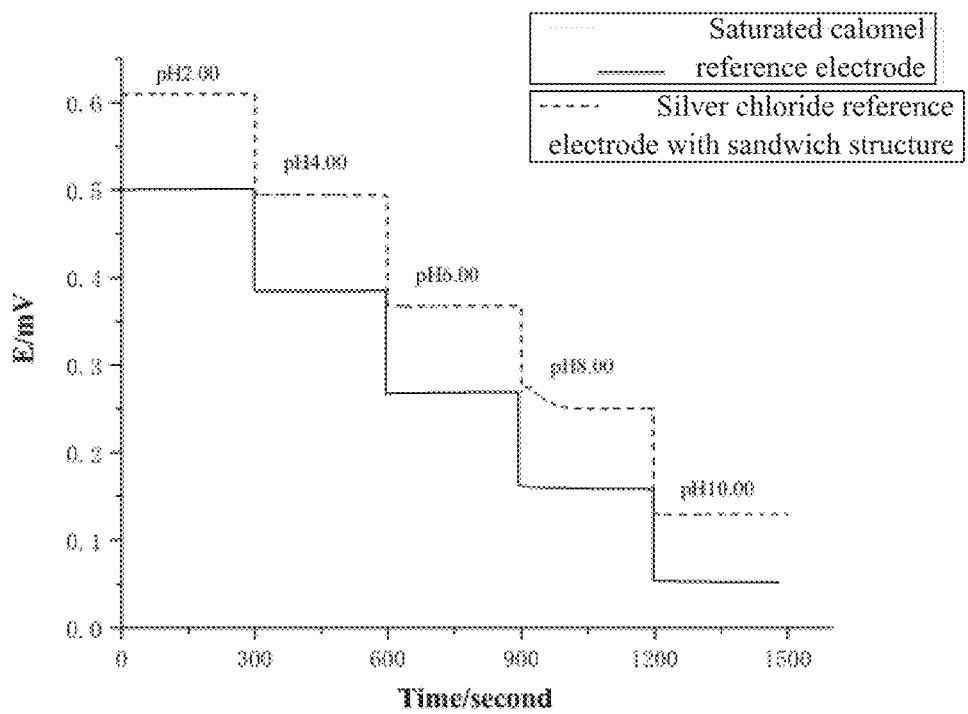
FIG. 6 shows a curve of the reference electrode with a SPEEK/IL sandwich structure.

As shown in FIG. 6, the curve of the reference electrode with a SPEEK/IL sandwich structure was almost parallel to the curve of a commercial reference electrode. This demonstrated that the reference electrode with a SPEEK/IL sandwich structure could provide a stable reference for the working electrode, and showed performances almost the same as those of a standard reference electrode.

Example 2

1) A PEEK powder was poured into concentrated sulfuric acid, and dissolved by stirring continuously; after the PEEK powder was completely dissolved, a resulting solution was heated to 50° C., and vulcanization was conducted for 3 h in an inert gas atmosphere.

2) A polymer solution obtained in step 1) was slowly poured into an ice-water mixture to terminate the vulcanization, obtained formed particles were collected, the particles were washed with water until a pH value of a washing solution reached 6 to 7, and the particles were air-dried and then dried in an oven at 70° C. for 16 h to obtain SPEEK particles.

3) The SPEEK particles were poured into a solvent, and dissolved by stirring to obtain a 10 wt % SPEEK solution.

4) The IL [HOEtMIM][Cl] was added dropwise into the 10 wt % SPEEK solution and stirred, where the SPEEK and the IL were at a mass ratio of 1:1, so as to obtain a SPEEK/IL solution.

5) The Ag/AgCl reference electrode was immersed into the IL [HOEtMIM][Cl], taken out and dried, such that a surface of the reference electrode was covered with an IL layer: an obtained IL layer-covered reference electrode was immersed into the SPEEK/IL solution for 5 s, the electrode was turned such that the electrode was completely covered by the solution, taken out and air-dried upside down to form one layer of SPEEK/L composite film on a surface of the IL layer-covered reference electrode.

6) Step 5) was repeated once on a final electrode product obtained in the step 5) to obtain two layers of SPEEK/IL composite film; an obtained bilayer SPEEK/IL composite film-covered reference electrode was immersed into the IL, taken out and dried, such that a surface of an outer layer of SPEEK/IL composite film was covered with an IL layer.

7) A final reference electrode product obtained in step 6) was immersed into the SPEEK solution, taken out and air-dried upside down to obtain a reference electrode with a SPEEK/IL sandwich structure.

Compared with Example 1, the SPEEK/IL composite film in this example did not contain SiO$_x$, and a ratio of free IL in an interlayer of the composite film to bound IL in the SPEEK was higher than that in Example 1. As a result, the IL in the interlayer of the electrode quickly dissipated into the polar solution during the measurement, resulting in a shortened service life of the reference electrode. However, Example 2 still had same performances as those of the standard reference electrode, and could provide a stable reference for the working electrode. In the present disclosure, the overall proton conductivity is increased by filling two layers of SPEEK/SiO$_x$/IL film with free IL. Meanwhile, due to the presence of high-concentration IL in the organic semipermeable film, a Cl$^-$ concentration on the surface of the Ag/AgCl reference electrode remains constant, thereby meeting the stability requirements as a reference electrode.

Example 3

1) PEEK particles were poured into concentrated sulfuric acid, and dissolved in an oil bath by constant stirring at 30° C.; after the PEEK particles were completely dissolved, a resulting solution was heated to 70° C., and vulcanization was conducted for 1 h in an inert gas atmosphere.

2) A polymer solution obtained in step 1) was slowly poured into an ice-water mixture to terminate the vulcanization, obtained formed particles were collected, the particles were washed with water until a pH value of a washing solution reached 6 to 7, and the particles were air-dried and then dried in an oven at 70° C. for 16 h to obtain SPEEK particles.

3) The SPEEK particles were poured into a solvent, and dissolved by stirring to obtain a 10 wt % SPEEK solution.

4) HCl, TEOS, deionized water, and ethanol as raw materials were mixed at a molar ratio of 0.01:1:4:4, and stirred to form a homogeneous solution as a precursor solution, the SPEEK solution obtained in step 3) was poured into the homogeneous solution and stirred uniformly, and the IL [HOEtMIM][Cl] was added dropwise and stirred to obtain a SPEEK/SiO$_x$/IL solution.

5) The Ag/AgCl reference electrode was immersed into the IL [HOEtMIM][Cl], taken out and dried, such that a surface of the reference electrode was covered with an IL layer; an obtained IL layer-covered reference electrode was immersed into the SPEEK/SiO$_x$/IL solution for 5 s, the electrode was turned such that the electrode was completely covered by the solution, taken out and air-dried upside down to form one layer of SPEEK/SiO$_x$/IL composite film on a surface of the IL layer-covered reference electrode.

6) Step 5) was repeated once on a final electrode product obtained in the step 5) to obtain two layers of SPEEK/SiO$_x$/IL composite film; an obtained bilayer SPEEK/SiO$_x$/IL composite film-covered reference electrode was immersed into the IL, taken out and dried, such that a surface of an outer layer of SPEEK/SiO$_x$/IL composite film was covered with an IL layer.

7) A final reference electrode product obtained in step 6) was immersed into the SPEEK solution, taken out and air-dried upside down to obtain a reference electrode with a SPEEK/IL sandwich structure. The performance testing results were similar to those in Example 1.

The above embodiments merely represent several implementations of the present disclosure, and the descriptions thereof are specific and detailed, but they should not be construed as limiting the patent scope of the present disclosure. It should be noted that those of ordinary skill in the art can further make several variations and improvements without departing from the concept of the present disclosure, and all of these fall within the protection scope of the present disclosure. Therefore, the protection scope of the present disclosure shall be subject to the protection scope defined by the claims.

What is claimed is:

1. A reference electrode with a SPEEK/IL sandwich structure, wherein an end of a reference electrode main body is provided with the SPEEK/IL sandwich structure; the SPEEK/IL sandwich structure comprises two layers of SPEEK/IL composite film and one layer of SPEEK film, and the SPEEK film serves as an outermost layer of the SPEEK/IL sandwich structure; an ionic liquid layer is separately filled between the reference electrode main body and an inner layer of SPEEK/IL composite film, between the two layers of SPEEK/IL composite film, and between a SPEEK/IL composite film and the SPEEK film; the SPEEK refers to sulfonated polyether ether ketone, and the IL refers to ionic liquid; and the IL is 1-(2-hydroxyethyl)-3-methylimidazolium chloride ([HOEtMIM][Cl]) with a structural formula as follows:

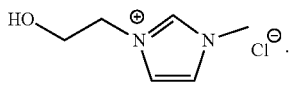

2. The reference electrode with the SPEEK/IL sandwich structure according to claim 1, wherein the SPEEK/IL composite film is a SPEEK/SiO$_x$/IL composite film; the SPEEK/IL sandwich structure comprises two layers of SPEEK/SiO$_x$/IL composite film and the one layer of SPEEK film, and the SPEEK film serves as the outermost layer of the SPEEK/IL sandwich structure; the IL layer is separately filled between the reference electrode main body and an inner layer of SPEEK/SiO$_x$/IL composite film, between the two layers of SPEEK/SiO$_x$/IL composite film, and between a SPEEK/SiO$_x$/IL composite film and the SPEEK film.

3. A preparation method of the reference electrode with the SPEEK/IL sandwich structure according to claim 2, comprising the following steps:

1) pouring polyether ether ketone (PEEK) particles into concentrated sulfuric acid, and dissolving by stirring continuously; after the PEEK particles are completely dissolved, heating a resulting solution to 35° C. to 70° C., and conducting vulcanization for 2 h to 4 h in an inert gas atmosphere;

2) slowly pouring a polymer solution obtained in step 1) into an ice-water mixture to terminate the reaction, collecting formed particles, washing the particles with water until a pH value of a washing solution reaches 6 to 7, and drying the particles in an oven at 50° C. to 70° C. for 12 h to 48 h to obtain SPEEK particles;

3) pouring the SPEEK particles into a solvent, and dissolving by stirring to obtain a 10 wt % SPEEK solution;

4) mixing an inorganic acid, a silicate, deionized water, and an alcohol as raw materials at a molar ratio of (0.01-0.1):1:(2-8):(2-8), and stirring to form a homogeneous solution; pouring the SPEEK solution obtained in step 3) into the homogeneous solution and stirring uniformly, and adding the IL dropwise into a solution and stirring to obtain a SPEEK/SiO$_x$/IL solution;

5) immersing the reference electrode main body into the IL, taking out and drying, such that a surface of the reference electrode is covered with an IL layer; immersing a reference electrode into the SPEEK/SiO$_x$/IL solution, taking out and air-drying upside down to form one layer of SPEEK/SiO$_x$/IL composite film;

6) repeating step 5) once on an electrode obtained in step 5) to obtain the two layers of SPEEK/SiO$_x$/IL composite film; immersing an obtained reference electrode into the IL, taking out and drying, such that a surface of an outer SPEEK/SiO$_x$/IL composite film is covered with an IL layer; and 7) immersing a reference electrode obtained in step 6) into the SPEEK solution, taking out and air-drying upside down to obtain the reference electrode with the SPEEK/IL sandwich structure.

4. The preparation method according to claim 3, wherein in step 1), the concentrated sulfuric acid has a concentration of 95% to 98%; in step 1), the dissolving is conducted at less than 30° C.; and the PEEK particles and the concentrated sulfuric acid are at a mass ratio of 1:(20-40).

5. The preparation method according to claim 3, wherein in step 3), the solvent is selected from the group consisting of N,N-dimethylformamide (DMF) and N,N-dimethylaniline (DMA); and in step 4), the inorganic acid is hydrochloric acid, the silicate is tetraethyl orthosilicate (TEOS), and the alcohol is ethanol.

6. The preparation method according to claim 3, wherein in step 4), the homogeneous solution and the SPEEK solution are at a volume ratio of 1:(4-7.5); and the IL and the SPEEK solution are at a volume ratio of 1:(1-3.3).

7. The preparation method according to claim 3, wherein the reference electrode main body is an Ag/AgCl reference electrode; the Ag/AgCl reference electrode is immersed in the SPEEK/SiO$_x$/IL solution or the SPEEK solution for 5 s to 10 s; and the Ag/AgCl reference electrode is immersed in the IL for 1 h to 12 h at 50° C. to 80° C. with help of ultrasonic wave.

8. The reference electrode with the SPEEK/IL sandwich structure according to claim 2, wherein the reference electrode main body is an Ag/AgCl reference electrode; and the SPEEK/IL sandwich structure completely covers AgCl on a surface of the reference electrode.

9. The reference electrode with the SPEEK/IL sandwich structure according to claim 1, wherein the reference electrode main body is an Ag/AgCl reference electrode; and the SPEEK/IL sandwich structure completely covers AgCl on a surface of the reference electrode.

10. A use method of the reference electrode with the SPEEK/IL sandwich structure according to claim 1 in pH value detection.

11. The use method according to claim 10, wherein in the reference electrode with the SPEEK/IL sandwich structure, the SPEEK/IL composite film is a SPEEK/SiO/IL composite film; the SPEEK/IL sandwich structure comprises two layers of SPEEK/SiO$_x$/IL composite film and the one layer of SPEEK film, and the SPEEK film serves as the outermost layer of the SPEEK/IL sandwich structure; the IL layer is separately filled between the reference electrode main body and an inner layer of SPEEK/SiO$_x$/IL composite film, between the two layers of SPEEK/SiO$_x$/IL composite film, and between a SPEEK/SiO$_x$/IL composite film and the SPEEK film.

12. The use method according to claim 10, wherein in the reference electrode with the SPEEK/IL sandwich structure, the reference electrode main body is an Ag/AgCl reference electrode; and the SPEEK/IL sandwich structure completely covers AgCl on a surface of the reference electrode.

\* \* \* \* \*